United States Patent [19]
Baxendale

[11] 3,896,907
[45] July 29, 1975

[54] HYDRAULIC DISC BRAKE

[75] Inventor: Charles L. Baxendale, Burleson, Tex.

[73] Assignee: Mechanics, Inc., Tex.

[22] Filed: Aug. 16, 1974

[21] Appl. No.: 498,139

[52] U.S. Cl. ............ 188/72.5; 188/264 G; 188/368; 188/369
[51] Int. Cl. ............................................ F16d 55/228
[58] Field of Search ........ 188/72.1, 72.4, 72.5, 368, 188/369, 370, 264 G; 92/87, 249

[56] References Cited
UNITED STATES PATENTS

| | | | |
|---|---|---|---|
| 2,667,947 | 2/1954 | Lucien | 188/72.4 |
| 2,754,936 | 7/1956 | Butler | 188/72.5 |
| 3,053,596 | 9/1962 | Farmer et al. | 92/87 |
| 3,112,014 | 11/1963 | Jeffries | 188/72.5 |
| 3,470,984 | 10/1969 | Goddard | 188/72.5 |
| 3,476,221 | 11/1969 | Schanz | 188/370 |
| 3,509,796 | 5/1970 | Osborne | 92/249 |
| 3,637,053 | 1/1972 | Boyles | 188/72.5 |
| 3,675,742 | 7/1972 | Thompson | 188/72.5 |
| 3,830,345 | 8/1974 | Boyles | 188/72.5 |

Primary Examiner—Trygve M. Blix
Assistant Examiner—Edward R. Kazenske

[57] ABSTRACT

Disclosed is a hydraulic disc brake of the type used for large trucks or tractor-trailer combinations and which is constructed to allow the brake to function effectively for longer periods of time than heretofore possible. The disc brake includes hydraulic pistons for actuating the brake shoes, cylinders in which the pistons operate, and an adjusting system for adjusting the brake shoes as their brake linings wear.

8 Claims, 11 Drawing Figures

PATENTED JUL 29 1975　　3,896,907

SHEET 2

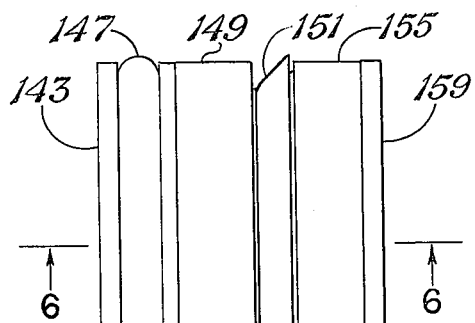
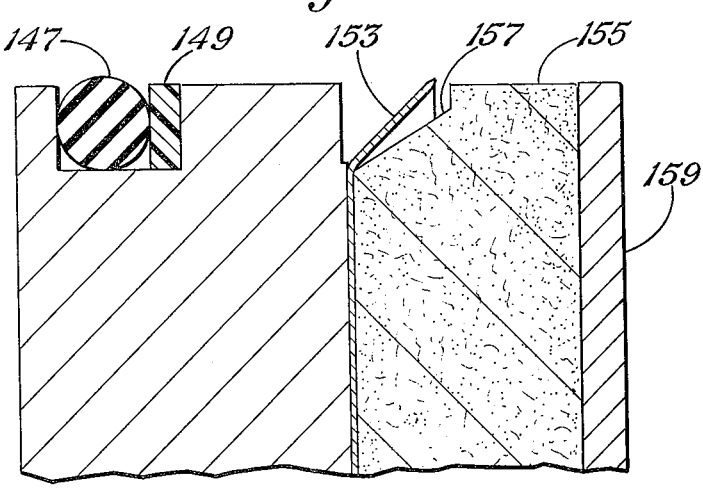
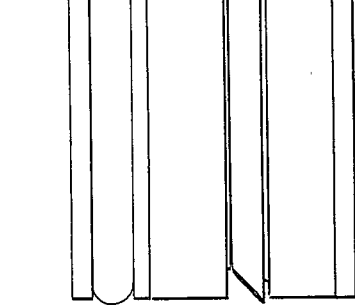
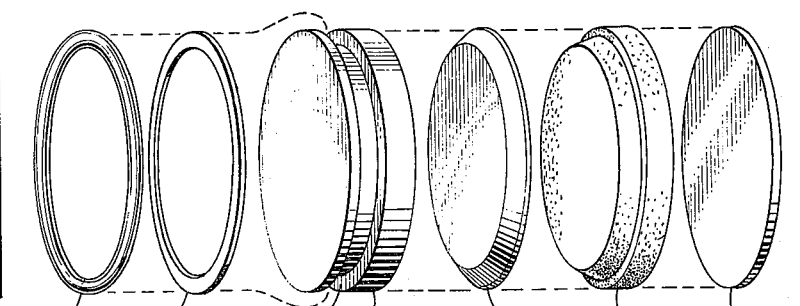
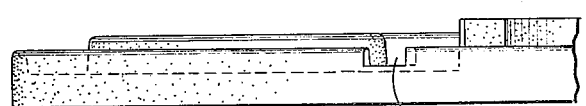
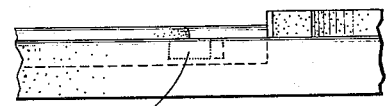
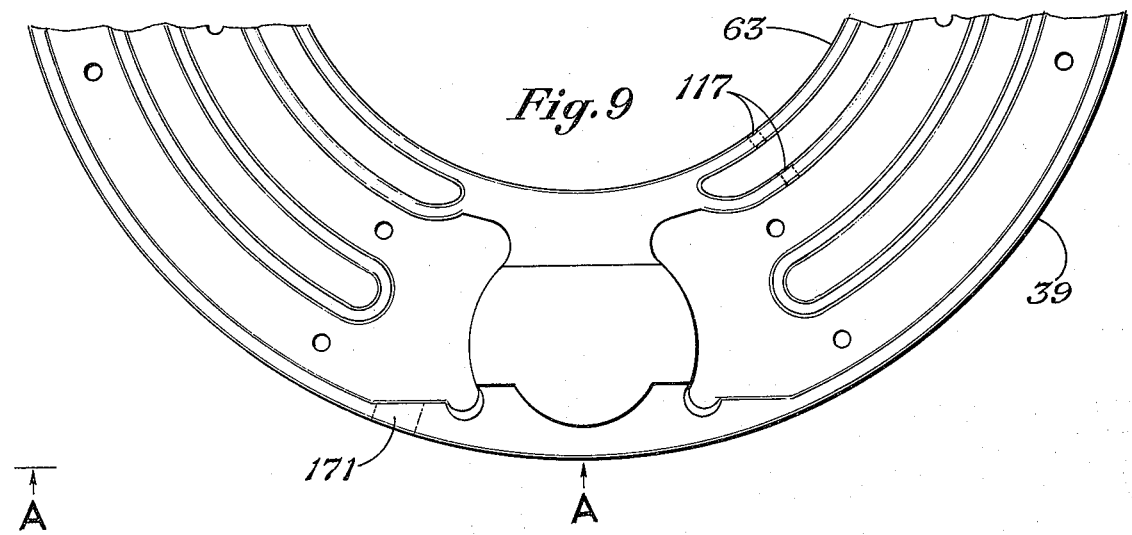

HYDRAULIC DISC BRAKE

BACKGROUND OF THE INVENTION

The present invention relates to hydraulic disc brakes and more particularly to improvements made in a hydraulic disc brake.

In our operations, we produce disc brakes for use on large trucks or tractor-trailer combinations. One such disc brake comprises a rotatable disc adapted to be coupled to a wheel for rotation with the wheel about its axis. A frame is provided to be fixedly secured to the vehicle and includes inner and outer housing means adapted to be located on opposite sides of the disc with the outer housing means located on the outer side of the disc and the inner housing means located on the inner side of the disc. Brake shoe means comprising brake shoes with liners are adapted to be supported on opposite sides of the disc between the disc and the walls of the inner and outer housing means respectively. The brake shoe means are supported for axial movement toward and away from the disc for effectively engaging and disengaging the disc. Each housing means has at least two cylindrical bores formed therein. Each cylindrical bore of the inner housing means is located opposite a cylindrical bore of the outer housing means. A piston assembly is slidably located in each cylindrical bore and is adapted to engage its associated brake shoe means. In addition, means is provided for admitting fluid under pressure to the cylindrical bores to move the piston assemblies and hence the brake shoe means toward the disc for engaging the brake shoe means with the rotatable disc to stop the vehicle.

The inner and outer housing means, as well as the brake shoes are formed of malleable cast iron. Biasing means is provided for normally urging the brake shoe means away from the disc and at least two adjustable bolts are threaded through each housing means for engagement with the back sides of the brake shoes for allowing adjustment of the distance between the liners of the brake shoes and the disc.

The piston assemblies previously employed included a piston member having a groove formed in its periphery with a resilient O-ring located therein, as well as a teflon backup washer. The teflon washer is located between the O-ring and the front side of the piston and provides a soft support for the O-ring against the pressure exerted by the hydraulic fluid. In order to facilitate placement of the teflon washer in the groove, it was gapped whereby it may be spread apart and fitted into the groove. When the piston assembly is moved by the hydraulic fluid to force the shoe liners into engagement with the disc for stopping the vehicle, a large amount of heat is generated which is transmitted to the piston. In order to protect the O-ring from the heat, an asbestos pad was located in front of the piston. Problems have occurred in the above system due to the effects of corrosion and the high pressure and heat encountered by the piston assembly and piston cylinders. In this respect, the cylinders, in effect, are open at their ends facing the brake shoes. In operating the vehicle on the road, dirt, water, and debris enters the cylinders which results in corrosion of the walls of the cylinders. This causes deterioration of the O-rings which results in loss of hydraulic fluid and hence loss of brake power. Moreover, the asbestos pads previously employed are relatively soft and the pressures encountered (1500 psi hydraulic fluid pressure) compresses the asbestos pads out of shape resulting in deterioration thereof and hence deterioration of the O-ring. Moreover, the gapped teflon washer either would not close properly or would loop upon itself thereby forming a small opening or crevice into which the O-ring is forced by the high pressure. This causes deterioration of the O-ring at that point thereby resulting in the loss of hydraulic fluid.

From experience, it has also been found that the ends of the brake shoe adjusting bolts tend to wear holes into the brake shoes where the bolts contact the shoes and penetration has been found to occur as much as one-fourth of an inch. This minimizes the amount that adjustment can be accomplished over a period of time. Moreover, penetration of the bolts into the brake shoes increases the stroke of the shoes which places a strain on the hydraulic master cylinder since more hydraulic fluid is required to force the brake shoes forward into engagement with the disc.

SUMMARY OF THE PRESENT INVENTION

It is an object of the present invention to provide improvements in a hydraulic brake system of the type mentioned above and which eliminates or minimizes the above problems and hence allows the brake to function effectively for longer periods of time than heretofore possible.

In one aspect, there is provided an improved piston assembly which comprises a cylindrical piston member having a groove formed in its periphery with a resilient O-ring located therein and a flexible, closed, ring-shaped washer located in the groove between the O-ring and the front side of the piston member. A thin disc wiper member formed of soft metal is located in front of the piston member, and a disc shaped heat shield is located in front of the disc wiper member. In addition, a protective metallic disc is located in front of the heat shield for engagement with the brake shoe when the piston member is moved by fluid pressure towards the brake shoe.

In a further aspect, the washer is formed of teflon and the thin disc wiper member is formed of brass. The wiper member has its peripheral edges flanged in a forward direction forming a pan shaped disc wiper member with its inside facing forward. The disc shaped heat shield has its peripheral rear edges shaped to conform generally with the peripheral flanged edges of the thin disc wiper member.

In another aspect, the heat shield is formed of asbestos fibers impregnated with a high heat resistant phenolic resin which can withstand a large amount of pressure without distortion and moreover, is very heat resistant. The cylinder bores are coated with a thin layer of nickel to prevent corrosion and to provide a hard wear surface for the pistons. The nickel coating is polished to a 15-micron finish or less, to provide a smooth surface for the O-rings to slide to prevent the O-rings from being blown out of the cylinder bores.

The wear problem of the brake shoes by the adjusting bolts has been solved by forming an opening or slot in the brake shoes at the position where the bolts engage the brake shoe and welding a nickel insert into the slot thereby providing a hardened surface against which the ends of the bolts are seated.

BRIEF DESCRIPTION OF THE DRAWINGS

FIG. 4 is a side view of the piston assembly of the present invention;

FIG. 5 is an exploded view of the piston assembly of FIG. 4;

FIG. 6 is an enlarged partial cross sectional view of the piston assembly of FIG. 4;

FIG. 9 is a partial plan view of a shoe of the brake of FIGS. 1 and 2 illustrating a nickel insert;

FIG. 10 is a side view of the shoe of FIG. 9 as seen from the arrows A—A illustrating a slot formed in the shoe for receiving the nickel insert; and FIG. 11 is a side view of the shoe of FIG. 9 as seen from the arrows A—A illustrating the nickel insert welded into the slot and having its top surface finished.

DETAILED DESCRIPTION OF THE INVENTION

Figure 1:
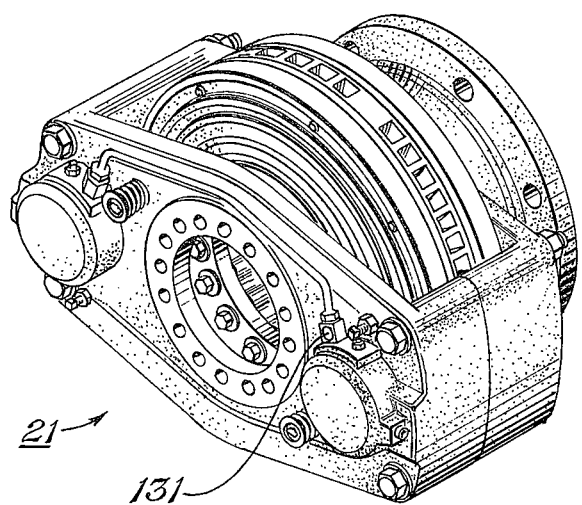
FIG. 1 is a perspective view of a hydraulic disc brake of the present invention.
Figure 2:
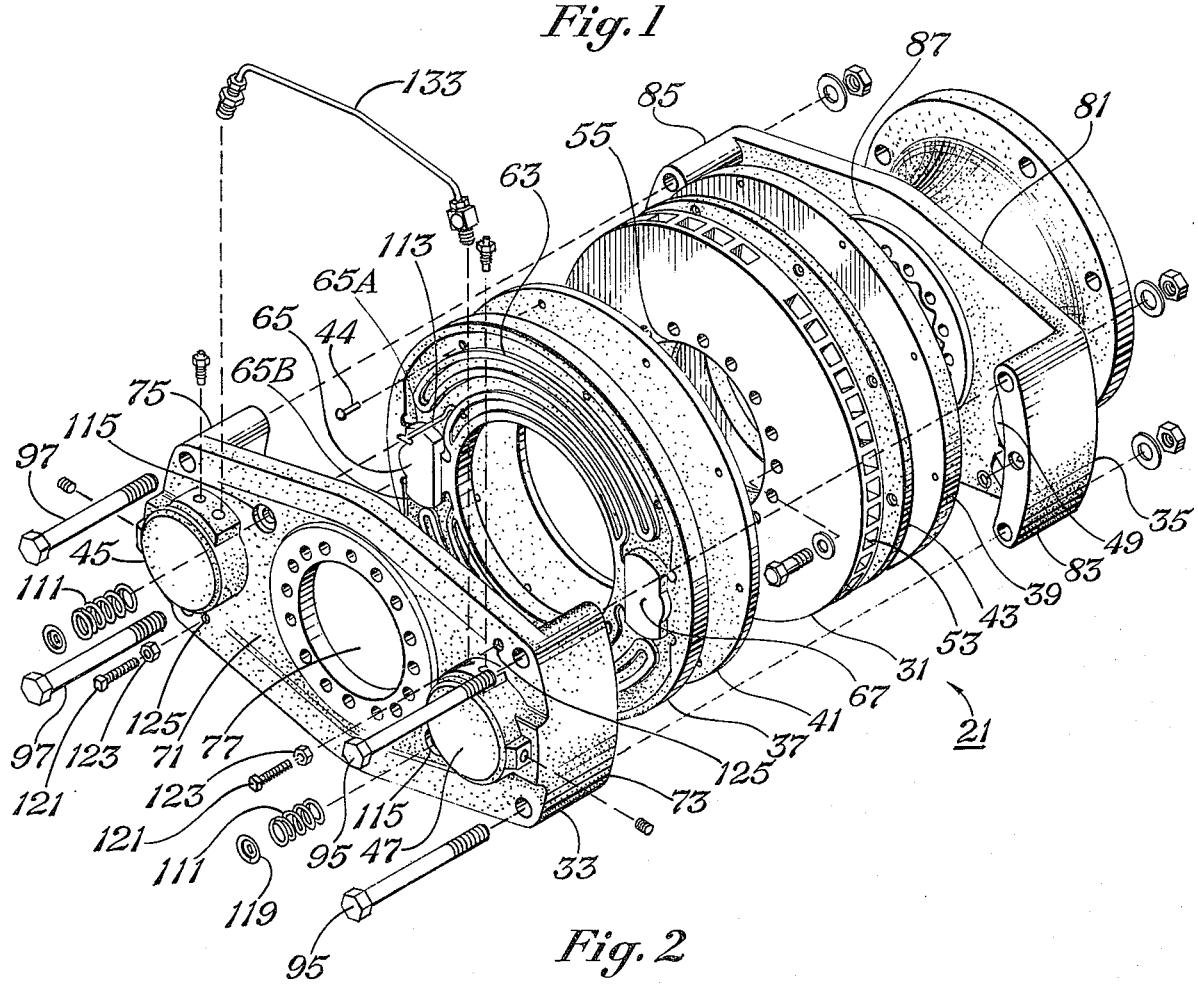
FIG. 2 is an exploded view of the brake of FIG. 1.
Figure 3:
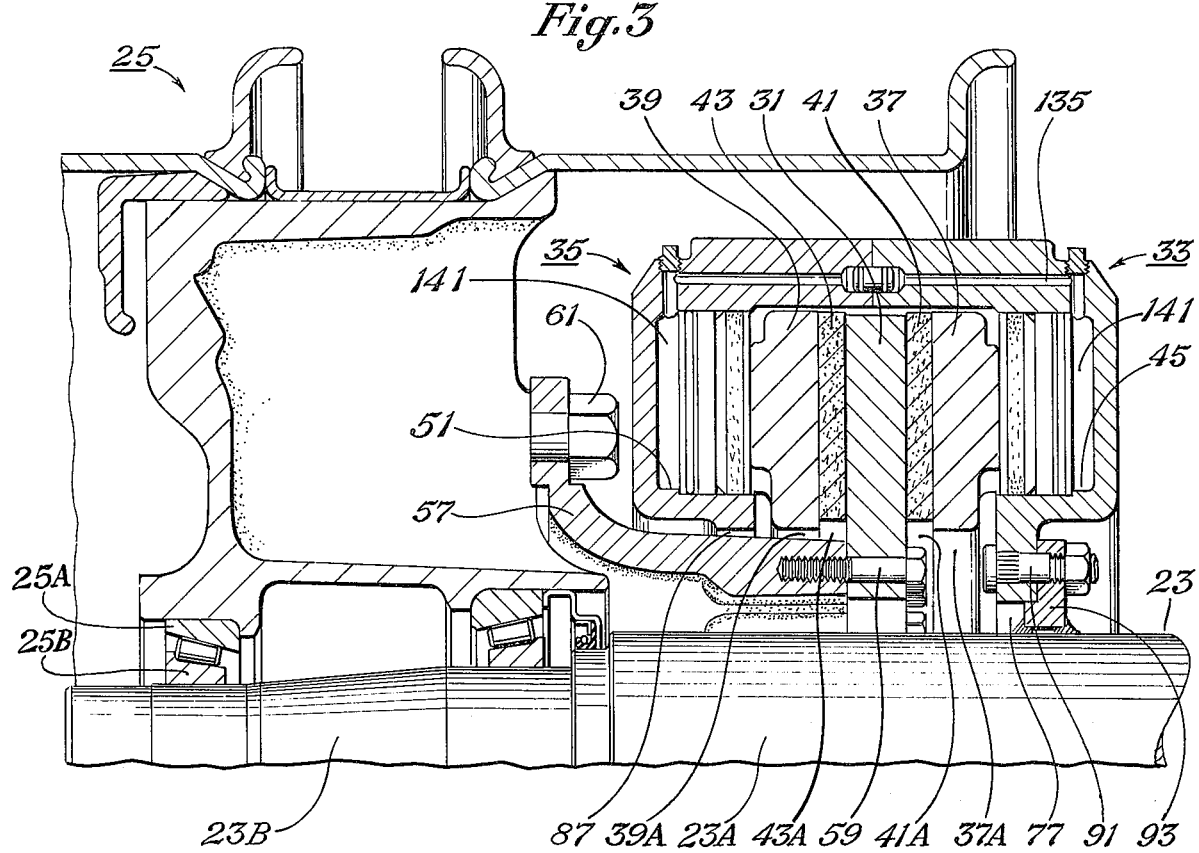
FIG. 3 is a partial cross sectional view of the brake of FIG. 1 shown mounted on a following, unpowered axle of a trailer.

Referring now to FIGS. 1 and 2, the disc brake in which the present improvements have been incorporated is identified at 21. In use, two of these brakes will be employed on each axle of a trailer of a tractor/trailer combination for controlling the wheels of the vehicle. In FIG. 3, the brake is shown connected to a following, unpowered axle 23 of a trailer. The wheel 25 is coupled to the axle by way of way of bearings 25A and 25B and rotates freely about the axle portion 23B.

Each disc brake comprises a rotatable steel disc 31, inner and outer housing members 33 and 35 located on opposite sides of the disc 31, and brake shoes 37 and 39 also located on opposite sides of the disc 31 and between the disc 31 and the inner and outer walls of the housing members 33 and 35 respectively. The disc 31 is connected to a wheel for rotation therewith while the housing members 33 and 35 are connected together with the inner housing member 33 connected to the axle, which is stationary relative to the vehicle, whereby the housing members are fixedly connected to the vehicle. The brake shoes 37 and 39 are supported for axial movement toward and away from the disc 31 and have friction liners 41 and 43 attached thereto for engagement with the disc for stopping the disc and hence the wheel. Liners 41 and 43 are attached to shoes 37 and 39 by bolts 44. The brake shoes 37 and 39 are prevented from rotating the torque lugs, as will be described subsequently. Each housing member 33 and 35 has two pair of cylinders 45, 47 (see FIG. 2) and 49, 51 (see FIG. 7) in which are located hydraulically controlled piston assemblies adapted to engage the back sides of the brake shoes 37 and 39 for moving the shoes and hence their liners against the disc for braking purposes. When the inner and outer housings 33 and 35 are connected together, cylinder 45 is in alignment with and opposite cylinder 51, as illustrated in FIG. 3, while cylinder 47 is in alignment with and opposite cylinder 49. In FIG. 3, the piston assemblies located in cylinders 45 and 51 are identified at 141 and will be described subsequently.

Referring specifically to FIGS. 2 and 3, the disc 31 is a steel member having slots 53 formed in its periphery for cooling purposes. In addition, the disc 31 has a central aperture 55 formed therethrough for receiving the axle of the vehicle. The disc 31 is connected to the hub of the wheel by way of an adaptor 57 and bolts 59 and 61 for rotation with the wheel around the axle.

The brake shoes 37 and 39, as well as the brake liners 41 and 43 also have central apertures formed therethrough for receiving the axle of a wheel of the vehicle. The central apertures of shoes 37 and 39 are identified at 37A and 39A while the central apertures of liners 41 and 43 are identified at 41A and 43A. Each brake shoe has fins 63 formed on its back side for cooling purposes. In addition, each shoe has a pair of raised surfaces 65 and 67, 180° apart, formed on its back side for engagement with the pistons located in the cylinders of its associated housing member. Opposite sides of each of the raised surfaces 65 and 67 are curved and slidably fit within torque lugs extending from the inside of the associated housing member to prevent rotation of the shoe. In FIG. 2, the curved opposite sides of raised surface 65 are identified at 65A and 65B. For purposes of clarity, the reference numeral designations of the curved opposite sides of raised surface 67 have been omitted.

The inner housing member 33 comprises an elongated wall 71 having short side walls 73 and 75 extending from its narrow edges. Formed through the wall 71 is a central aperture 77. The pair of cylinders 45 and 47 are also formed in the wall 71 and are located 180° apart relative to the central aperture 77 for holding the hydraulically actuated pistons for engaging the brake shoe 37. Similarly, outer housing member 35 comprises an elongated wall 81 having short side walls 83 and 85 extending from its narrow edges. Formed through the wall 81 is a central aperture 87 and located on opposite sides of the aperture 87 are the two cylinders 49 and 51 for holding its pair of hydraulically actuated pistons for engaging the brake shoe 39. In assembly, the disc 31, the shoes 37 and 39 and their liners 41 and 43, and the housing members 33 and 35 are fitted around the axle 23, with the outer housing member 35 located on the outer side of the disc 31 and the inner housing member 33 located on the inner side of the disc. Shoe 39 is located between wall 81 of outer housing member 35 and the disc 31 while shoe 37 is located between the wall 71 of inner housing member 33 and the disc 31. The inner housing member 33 is connected by bolts 91 to a flange 93 which is welded around the axle portion 23a. The two housing members 33 and 35 are connected together by a pair of bolts 95 extending through side walls 73 and 83 and by a pair of bolts 97 extending through the side walls 75 and 85 of the housing members 33 and 35. Thus, the housing frame comprising housing members 33 and 35 is fixedly secured to the axle and hence to the vehicle frame. As indicated above, the disc 31 is secured to the wheel hub by way of adaptor 57 and bolts 59 and 61 whereby the disc 31 may rotate within the housing members 33 and 35. When the brake is assembled to the axle and to the wheel, the inward edge of the adaptor 57 extends freely through the central apertures formed through the outer housing member 35 and through the brake shoe 39 and its liner. When the two housing members 33 and 35 are connected together, their walls 71 and 81 are spaced apart far enough to allow a small amount of axial movement of the shoes 37 and 39, and their liners, between the housing members and the disc. In addition, the side walls 73 and 75 and 83 and 85 are spaced radially outward from the disc 31 and the brake shoes 37 and 39. Thus, the disc 31 is free to rotate within the housing members when the shoes and their liners are out of engagement with the disc and the brake shoes and their liners may move axially between the disc and the inner and outer housing members.

Figure 7:
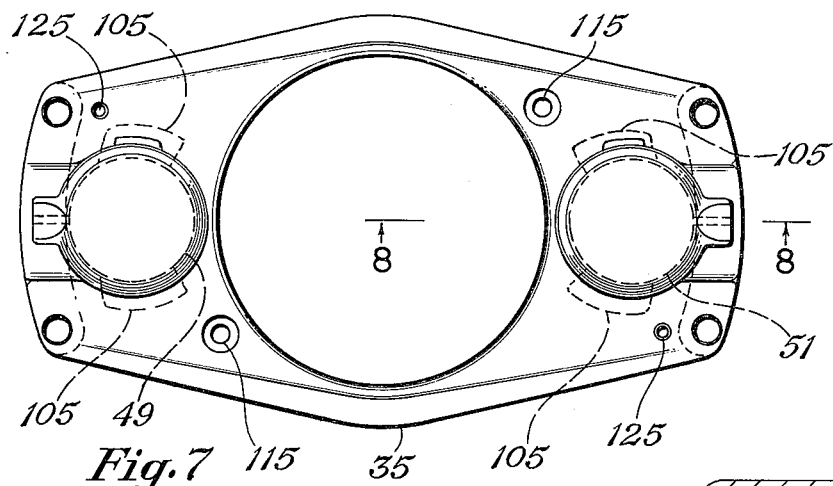
FIG. 7 is a plan view of the outer housing of the disc brake of FIGS. 1 and 2.
Figure 8:
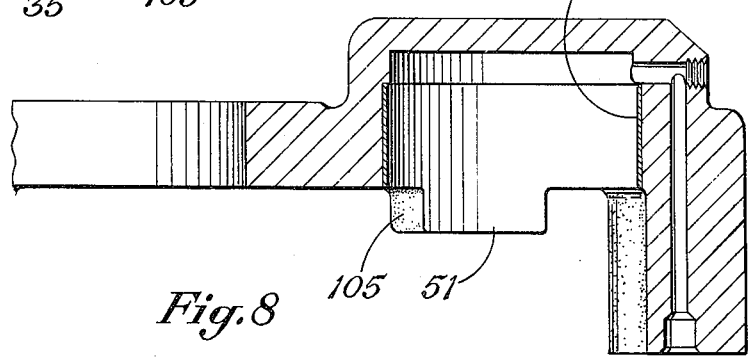
FIG. 8 is a cross sectional view of the housing of FIG. 7 taken through the lines 8—8 thereof.

As illustrated in FIGS. 7 and 8, the outer housing 35 has a pair of torque lugs 105 extending inward from each of its cylinders 49 and 51. Although not shown, the inner housing member 33 also has a similar pair of torque lugs extending inward from each of its cylinders 45 and 47. These torque lugs slidably engage the curved side edges of the raised surfaces 65 and 67 of the brake shoes 37 and 39 to prevent the brake shoes from rotating but to allow the brake shoes to slide toward and away from the disc 31.

The brake shoes 37 and 39 and their liners normally are biased away from the disc 31 and adjusted such that normally there is a gap of the order of .030 of an inch between the brake liners 41 and 43 and the disc 31. Referring to the brake shoe 37, it is normally urged away from the disc 31 by a pair of springs 111 which are coupled to the brake shoe 37 by way of a pair of hooks 113. The springs 111 are located on the back side of the housing 33 and are seated in apertures 115 formed through the housing on opposite sides of central aperture 77. The hooks 113 are connected to the back side of brake shoe 37 and extend through apertures 115 to the back side of housing 33 where they are coupled to springs 111. In FIG. 2, only one hook 113 is illustrated. The hooks 113 are connected to the brake shoe 37 by inserting their hooked ends through apertures 117 formed in cooling fins 63 (see also FIG. 9). The opposite ends of the hooks 115 are T-shaped and extend through the springs 111 and through slots formed in caps 119 which seat against the springs 111. Thus, the springs 111 are connected to the brake shoe 33 by way of hooks 115 and normally urge the shoe 37 away from the disc. A similar arrangement is provided for urging the shoe 39 away from the disc 31.

The desired gap between the brake shoe liner 41 and the disc 31 is maintained by way of adjusting screws 121 having square heads. These screws are threaded through lock nuts 123 and through apertures 125 formed through the housing 33 to allow their ends to engage and seat against the brake shoe 37. The apertures 125 are located 180° apart relative to the central aperture 77 of housing 33. As the brake lining 41 wears, the screws 121 are adjusted to maintain the desired gap between the lining and the disc brake. A similar adjustment arrangement is provided for the brake shoe 39 for maintaining the desired gap between its liner and the disc 31.

Hydraulic fluid is applied to the cylinders 45 and 47 behind their pistons by way of an inlet 131 and tubing 133. From the cylinders 45 and 47, the fluid flows to the cylinders 51 and 49 respectively by internal passages 135, as illustrated in FIG. 3.

Referring now to FIGS. 4-6, there will be described the improved piston assembly of the present invention which is located in each of the four cylinders 45, 47, 49, and 51. The piston assembly is identified at 141 and comprises a steel piston member 143 having a groove 145 formed in its periphery. Located in the groove is an O-ring 147 and a closed ring-shaped washer 149 formed of teflon. Located in front of the piston member 143 is a thin disc wiper 151 formed of brass and which has its peripheral edges 153 flanged in a forward direction forming a pan shaped wiper. It is located such that its inside faces forward. Located in front of the wiper 151 is a disc shaped heat shield 155 having its rear edge 157 shaped to conform generally with the peripheral flange 153 of the wiper 151. Located in front of the heat shield 155 is a thin metallic disc 159. The members 143, 151, 155, and 159 are not connected together but move together as a unit when the fluid pressure is increased in the cylinder behind the piston member 143 to move the piston assembly forward or when the pressure is released and the brake shoe is biased away from the disc 31 by the springs 111.

The purpose of the teflon washer 149 is to provide a soft backup support for the O-ring 147. Since the washer 149 has no gaps therein, there are no crevices or small openings into which the O-ring 147 can be forced thereby eliminating the deterioration problem of the O-ring previously encountered with a gapped washer. In one embodiment, the O-ring 147 is formed of Ethylene Propylene. The piston member 143 has a diameter of 2.995(+0.002; −0.000) inches. Each of the cylinders 45, 47, 49 and 51 has an inside diameter of 3 inches. The wiper 151 has an outside diameter of 3.010 inches and its purpose is to push and wipe out any dirt or debris from the cylinders as the piston assembly is moved toward the brake shoe by the hydraulic pressure.

The heat shield 155 is a molded part formed from a molding compound composed of long spinning grade Chrysotile asbestos fibers Grade AAAA. It is of the "B" stage variety impregnated with a high heat resistant phenolic resin system. The molding compound is identified as R/M Style 150-RPD. The molding compound is available with a resin content of 38–43%, a volatile content of 3–12% and a flow cup run of 4–20 seconds. The compound is molded at pressures of 2,000 psi and above at a temperature of 275° to 325°F with a post cure. A molded piece with a 4-½ inch OD × 12 inches long has the following properties: specific gravity 1.76; elongation, % 0.40; $T_u$, psi 3,960; $E_t \times 10^{-6}$, psi 1.16; $F_u$, psi 15,000; $E_f \times 10^{-6}$, psi 1.36; $C_u$, psi 14,200; $E_c \times 10^{-6}$, psi 1.30; $S_u$, psi 11,700. The heat shield is cut from a 3-½ inch OD × 12 inch bar. The molding compound and molded pieces are available from Aerospace Division - Raybestos - Manhattan, Inc., Manheim, Pa. The heat shield 155 has advantages in that it can withstand high temperatures and moreover, can withstand high pressures without being deformed. Hence, it has high compressibility features which is desirable in the brake of the present system since the fluid pressures for actuating the piston assembly are up to 1,500 psi. The heat shield employed has a diameter of 2.975 inches and a total thickness of 0.375 of an inch. The protective metallic disc 159 is formed of steel and has a diameter of 2.975 inches. Its purpose is to engage the shoe and to provide protection for the heat shield to prevent the heat shield from breaking.

The cylinders 45, 57, 59, and 51 of the inner and outer housings 33 and 35 have their insides coated with a thin layer of nickel illustrated at 161 in the cylinder 51 of FIG. 8. The nickel coating has a thickness of from 0.0004 0.0006 of an inch. It is polished to a 15 micron finish or less. The purpose of the nickel coating is to prevent corrosion of the cylinders due to water, dirt, or debris and to provide a hard surface for the piston assemblies to work in. It has a very fine polish finish to allow the piston assembly to move readily in the cylinders with a minimum of resistance and hence minimizes and prevents the O-rings from being blown out of the cylinders.

Hence, the improvements made to the pistons and the cylinders have resulted in a much more effective brake in that corrosion is minimized or eliminated and hence the O-rings are allowed to function for much longer time without leakage of brake fluid, thereby allowing the brakes to function effectively for a much longer period of time than heretofore possible. As can be seen, the brake system, in effect, is an open system in that the insides of the cylinders are open to the shoes and hence open to the environment around the wheels. In operation of a vehicle on the road, dirt, debris, and water will be thrown into the brake system and hence can enter the cylinder which, prior to the present invention, caused corrosion of the cylinder walls which resulted in deterioration of the O-ring and hence leakage of the brake fluid. By coating the cylinder walls with the nickel, corrosion is minimized or eliminated and by providing the wipers 151 any dirt or debris which enters the cylinders is pushed out of the cylinders whereby the O-rings are maintained in a much more desirable environment to increase their useful lifetime. The purpose of the heat shield 155 is to protect the O-rings from the heat generated by the braking action of the shoes against the disc. Since the heat shield can withstand a large amount of pressure, the fluid pressure employed in operating the brakes will not cause the heat shield to be distorted thereby allowing the heat shield to perform its function for a much longer time than heretofore possible. The heat shield 155 in turn is protected by the metallic disc 159. Since the teflon washers have no gaps, there are no crevices in which the O-rings can be forced thereby eliminating the deterioration problem heretofore caused by the gapped teflon washers.

Referring now to FIGS. 9–11, there will be described the improvement for preventing the adjusting screws 121 from wearing into the brake shoes thereby allowing proper adjustment of the brake shoes to be maintained as long as the brake liners are still effective and eliminating the strain on the hydraulic fluid system. As described previously, two adjusting screws 121 are threaded through two apertures 125 formed through each of the inner and outer housings for engagement with the associated brake shoes at positions in line with the apertures 125. In FIG. 9, a portion of the brake shoe 39 is illustrated. The surface where one of the adjusting screws seats or engages is identified at 171. This surface is a hard nickel surface which is obtained by forming a slot 173 in the shoe at this point, as illustrated in FIG. 10 and welding a nickel insert into the slot and then finishing the top of the nickel insert flush with the shoe 39, as illustrated in FIG. 11. The opposite seating surface for the other adjusting screw is formed in a similar manner, as well as the seating surfaces for the adjusting screws for the brake shoe 37. With this improvement, wear of the adjusting screws into the brake shoes has been completely eliminated thereby allowing the proper gap to be obtained between the liners of the brake shoes and the disc and eliminating the hydraulic brake fluid strain.

In one embodiment, the nickel welded into the slots 173 of the shoes is identified as nickel arc 99, pure nickel electrode for welding cast iron which is available from Alloy Rods, Division of Chemetron Corporation. The brake shoes and inner and outer housings are formed of malleable cast iron. The wipers 151 of the piston assemblies are formed of half-hard rolled brass. The nickel for plating the insides of the cylinders 45, 47, 49, and 51 is an electroplating solution deposited on the walls of the cylinders by electroplating. The nickel electroplating solution may be mixed in five gallon quantities by the following steps. Heat 2-½ gallons of distilled water in a double boiler to 180°. Add 2 pounds of Boric Acid; mix until dissolved. Remove from heat. Add 12-½ pounds of nickel sulfate; mix until dissolved. (2-½ pounds of nickel sulphate per gallon.) Add 4 pounds of nickel chloride; mix until dissolved. Add sufficient distilled water to make a total of 5 gallons of solution; mix thoroughly. Add 4 ounces of 32-B Wetting agent; mix very thoroughly with stir rod and by shaking a 5 gallon container.

Although the brake was described as being employed on an unpowered, following axle of a trailer, it is to be understood that it could be employed on a powered axle, for example, on a tractor or truck for controlling its wheels. In such use, two brakes will be employed on each powered axle, in a manner as described previously, for controlling the wheels thereof.

I claim:

1. In a disc brake assembly for a wheel of a vehicle comprising:

a rotatable disc means adapted to be coupled to a wheel for rotation with the wheel about its axis, frame means adapted to be fixedly secured to the vehicle and including inner and outer housing means adapted to be located on opposite sides of said disc means with said outer housing means located on the outer side of said disc means and said inner housing means located on the inner side of said disc means, brake shoe means adapted to be supported on opposite sides of said disc means between said disc means and the walls of said inner and outer housing means respectively, said brake shoe means being supported for axial movement toward and away from said disc means for effectively engaging and disengaging said disc means, each housing means having at least two cylindrical bores formed therein, each cylindrical bore of said inner housing means being located opposite a cylindrical bore of said outer housing means, a piston assembly slidably located in each cylindrical bore and adapted to engage its associated brake shoe means, and means for admitting fluid under pressure to said cylindrical bores to move said piston assemblies and hence said brake shoe means toward said disc means for engaging said brake shoe means with said disc means, an improved piston assembly, comprising:

a cylindrical piston member having a front side and opposite rear side to which fluid pressure is applied for moving said piston member toward its associated brake shoe means, a groove formed in the periphery of said piston member, a resilient O-ring located in said groove, a flexible, closed, ring-shaped support member located in said groove between said O-ring and the front side of said piston member, a thin disc wiper member formed of soft metal located in front of said piston member and having a diameter slightly greater than the diameter of said piston member, a disc shaped heat shield located in front of said disc wiper member, and a protective metallic disc located in front of said heat shield for engaging the associated brake shoe means when said piston member is moved by fluid pressure toward its associated brake shoe means.

2. In a disc brake assembly for a wheel of a vehicle comprising:

a rotatable disc means having a central aperture formed therethrough for receiving the axle of the vehicle and adapted to be coupled to the wheel for rotation with the wheel about the axle, inner and outer housing members having central apertures formed therethrough for receiving the vehicle axle and adapted to be located on opposite sides of said disc means, means for attaching the housing members together with said outer housing member located on the outer side of said disc means and said inner housing member located on the inner side of said disc means, means for attaching the inner housing member to the vehicle axle, two brake shoe means having central apertures formed therethrough for receiving the axle and adapted to be supported on opposite sides of said disc means between said disc means and the walls of said inner and outer housing members respectively, said brake shoe means being supported for axial movement toward and away from said disc means for effectively engaging and disengaging said disc means, each housing member having at least two cylindrical bores formed therein on opposite sides of its central aperture, each cylindrical bore of said inner housing member being located opposite a cylindrical bore of said outer housing member when said inner and outer housing members are attached together, a piston assembly slidably located in each cylindrical bore and adapted to engage its associated brake shoe means, and means for admitting fluid under pressure to said cylindrical bores to move said piston assemblies and hence said brake shoe means toward said disc means for engaging said brake shoe means with said disc means, an improved piston assembly, comprising:

a cylindrical piston member having a front side and opposite rear side to which fluid pressure is applied for moving said piston member toward its associated brake shoe means, a groove formed in the periphery of said piston member, a resilient O-ring located in said groove, a flexible, closed, ring-shaped support member located in said groove between said O-ring and the front side of said piston member, a thin disc wiper member formed of soft metal located in front of said piston member and having a diameter slightly greater than the diameter of said piston member, a disc shaped heat shield located in front of said disc wiper member, and a protective metallic disc located in front of said heat shield for engaging the associated brake shoe means when said piston member is moved forward by fluid pressure toward its associated brake shoe means.

3. The piston assembly of claim 2 wherein:

said annular support member is formed of teflon, said thin disc wiper member has its peripheral edges flanged in a forward direction forming a pan shaped disc wiper member with its inside facing forward, said thin disc wiper member being formed of brass, said disc shaped heat shield having its peripheral rear edges shaped to conform generally with the peripheral flanged edges of said thin disc wiper member.

4. The piston assembly of claim 3 wherein:

said heat shield is formed of asbestos fibers impregnated with a high heat resistant phenolic resin.

5. The disc brake assembly of claim 2 wherein:

each of said cylindrical bores are coated with a thin layer of nickel.

6. The disc brake assembly of claim 5 wherein the nickel alloy coating of said cylindrical bores is polished to a 15-micron finish or less.

7. The improved piston assembly of claim 6 wherein:

said thin disc wiper member has its peripheral edges flanged in a forward direction forming a pan shaped disc wiper member with its inside facing forward, said thin disc wiper member being formed of brass, said disc shaped heat shield having its peripheral rear edges shaped to conform generally with the peripheral flanged edges of said thin disc wiper member.

8. The piston assembly of claim 7 wherein:

said heat shield is formed of asbestos fibers impregnated with a high heat resistant phenolic resin.

* * * * *